May 8, 1956 A. E. KEMPTON 2,745,026
HOUSING FOR SPINDLE MOTOR
Filed April 6, 1955
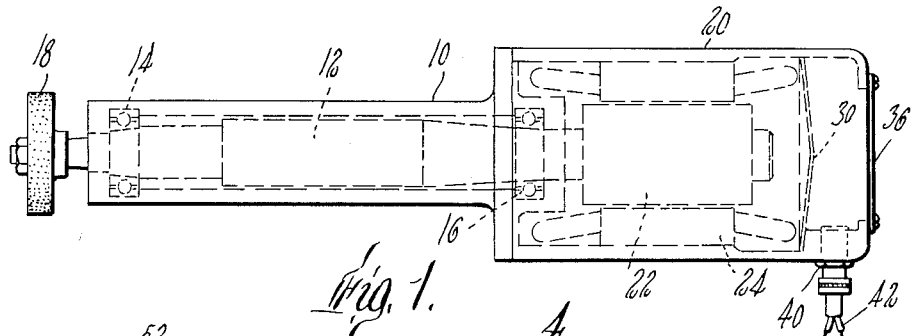
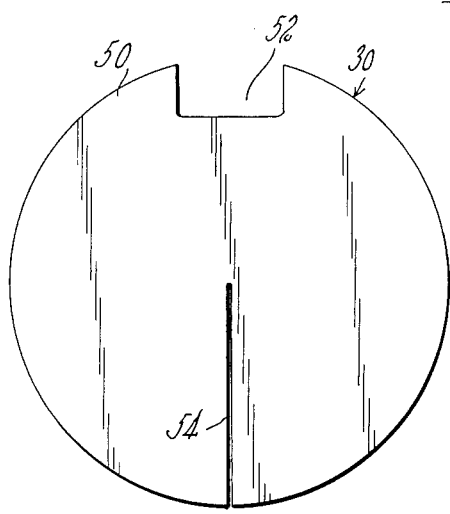
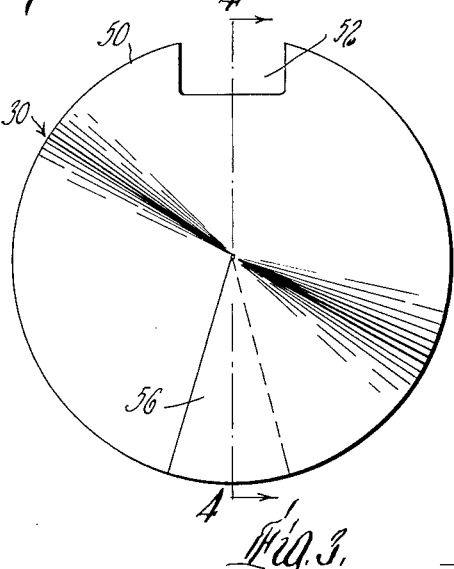
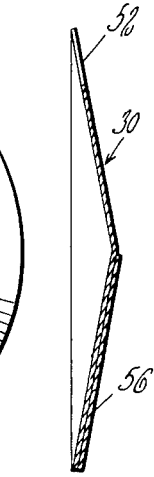
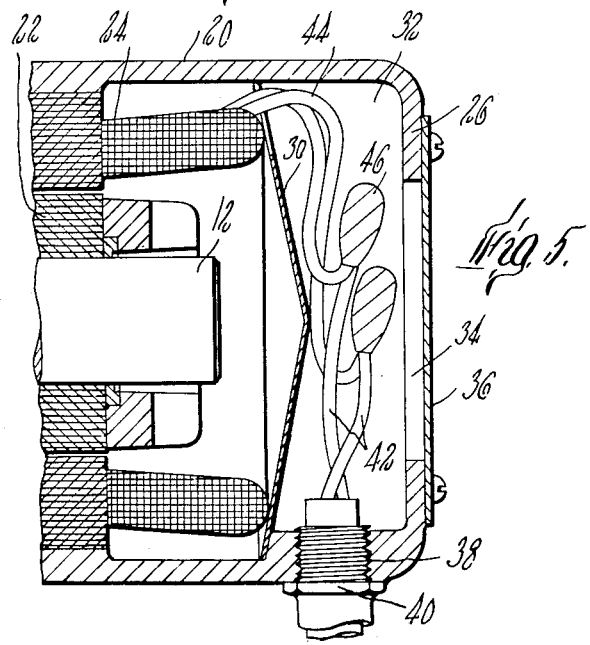
Inventor
Albert E. Kempton
by Wright, Brown
Quinby May
Attys.

United States Patent Office 2,745,026
Patented May 8, 1956

2,745,026
HOUSING FOR SPINDLE MOTOR

Albert E. Kempton, Andover, Mass., assignor to Pope Machinery Corporation, Haverhill, Mass., a corporation of Massachusetts Application April 6, 1955, Serial No. 499,556

1 Claim. (Cl. 310—89)

This invention relates to an improved housing for electric motors, and more particularly to a housing for a spindle motor which has a bearing at one end only of the motor. Motors for driving spindles usually have several leads from the stator windings which must be connected to the power leads through which power is supplied to the motor. This requires a considerable number of connections at or near the motor, and a junction box is often mounted on or near the motor casing to enclose and protect these connections. According to the present invention, a light, strong partition is inserted in the motor casing between the free end of the rotor and stator and the adjacent end wall of the motor casing. This forms a compartment in the end of the casing for the connections between the motor leads and the power leads, so that the outside junction box is eliminated and space saved.

The partition member is preferably made of stiff dielectric paper as hereinafter described. This confines the wiring connections between the motor leads and power leads to a compartment in the end of the motor casing. For a more complete understanding of the invention, reference may be had to the following description thereof and to the drawing, of which—

Figure 1 is an elevational view of a unitary spindle and motor for a surface grinding tool;

Figure 2 is an elevational view of a blank for a partition member;

Figure 3 is an elevational view of the completed partition member;

Figure 4 is a section on the line 4—4 of Figure 3; and

Figure 5 is a fragmentary sectional view of the structure shown in Figure 1, on a larger scale.

A unitary, wholly enclosed surface grinder spindle and motor is shown in Figure 1. This comprises a casing or housing 10 within which is mounted a spindle 12 in bearings 14 and 16. One end of the spindle projects out of the casing and carries a grinding wheel 18 or other tool. The other end of the spindle extends into a larger portion 20 of the casing and carries the rotor 22 of an electric motor the stator 24 of which is mounted within the larger casing 20. As shown, there are bearings at one end only of the motor, there being no outboard bearing at the end of the motor where the spindle shaft 12 terminates. In the motor illustrated, the stator 24 projects beyond the end of the spindle shaft 12 but is spaced from the end wall 26 of the casing 20.

According to the invention, a partition member 30 is installed in the casing 20 against the end of the stator 24 to define a compartment 32 within the end of the casing 20. The casing 20 is made with an end opening 34 of considerable size, closed by a plate 36 which is removable to afford easy assess to the compartment 32. The casing 20 is also made with a threaded hole 38 opening through its cylindrical wall into the compartment 32 near the end wall 26. An electrical bushing 40 is screwed into this hole to provide for the admission of power leads 42 into the compartment. By removal of the plate 36, access is had to the ends of the power leads 42 and the motor leads 44 which may be numerous, and suitable connections 46 can readily be made, after which the plate 36 is replaced.

The partition member 30 is of insulating material and may easily be made by cutting or dieing out a circular disk 50 of slightly larger diameter than the interior diameter of the casing 20. The disk may be of heavy paper which has been impregnated with any suitable dielectric material such as a synthetic resin. At the top of the disk a notch 52 is cut to provide a passage for the motor leads into the compartment 32. A radial slit or slot 54 is cut from the center of the disk to the circumference. The portions of the disk adjacent to the slit 54 are then overlapped, as at 56 to reduce the circumference and therefore the diameter of the disk so that it will fit within the casing 20 and against the free end of the stator 24. This deforms the disk to the shape of a flat cone which can be fitted into casings of different sizes within limits. The conical shape makes for rigidity of the partition member. This latter is a substantially complete barrier which protects the rotor from the wiring and connections in the compartment 32 so that such connections can be safely enclosed within the casing 20.

I claim:

In combination with a cylindrical casing having an opening at one end almost as large as the cross-sectional area of the casing, a removable plate normally closing said opening, an electric motor mounted in said casing and spaced from said plate to provide space for multi-wire connections, a bushing extending through the wall of said casing near said end, and a conical partition member of stiff dielectric paper against the end of the motor nearest to said plate forming a substantially complete barrier between said motor and said space.

References Cited in the file of this patent

UNITED STATES PATENTS

| | | |
|---|---|---|
| 1,387,470 | Cook | Aug. 16, 1921 |
| 2,102,390 | Steenstrup | Dec. 14, 1937 |
| 2,339,743 | Norman | Jan. 18, 1944 |
| 2,348,341 | Gough | May 9, 1944 |
| 2,592,070 | Robinson | Apr. 8, 1952 |